United States Patent
Bauer et al.

(10) Patent No.: US 10,059,886 B2
(45) Date of Patent: Aug. 28, 2018

(54) REJUVENATION OF BIOPYROLYSIS OIL HYDROPROCESSING REACTORS

(71) Applicant: KiOR, Inc., Pasadena, TX (US)

(72) Inventors: Lorenz Bauer, Pasadena, TX (US);
Dave Smith, Friendswood, TX (US);
Michael Lee, Houston, TX (US);
Changan Zhang, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 301 days.

(21) Appl. No.: 14/454,401

(22) Filed: Aug. 7, 2014

(65) Prior Publication Data

US 2016/0040077 A1 Feb. 11, 2016

(51) Int. Cl.
| | |
|---|---|
| *C10G 3/00* | (2006.01) |
| *B08B 3/08* | (2006.01) |
| *C10G 75/00* | (2006.01) |
| *B08B 5/02* | (2006.01) |

(52) U.S. Cl.
CPC ............ *C10G 3/50* (2013.01); *B08B 3/08* (2013.01); *B08B 5/02* (2013.01); *C10G 75/00* (2013.01); *Y02P 30/20* (2015.11)

(58) Field of Classification Search
CPC .. C10G 3/50; C10G 75/00; B08B 5/02; B08B 3/08
USPC .................................................. 585/733, 950
See application file for complete search history.

(56) References Cited

U.S. PATENT DOCUMENTS

| | | | |
|---|---|---|---|
| 4,795,841 A * | 1/1989 | Elliott | C10G 1/002 |
| | | | 201/2.5 |
| 5,817,589 A | 10/1998 | De Agudelo et al. | |
| 7,425,657 B1 | 9/2008 | Elliott et al. | |
| 7,652,181 B1 | 1/2010 | Schmidt et al. | |
| 2008/0128330 A1 | 6/2008 | McCoy et al. | |
| 2011/0009614 A1 | 1/2011 | Blommel et al. | |
| 2013/0158329 A1 | 6/2013 | Brandvold | |
| 2014/0034554 A1 | 2/2014 | Kulprathipanja et al. | |
| 2014/0102874 A1 | 4/2014 | Keusenkothen | |
| 2014/0261715 A1* | 9/2014 | Abhari | C10L 10/00 |
| | | | 137/12 |

FOREIGN PATENT DOCUMENTS

| | | | | |
|---|---|---|---|---|
| JP | 2011/068859 | | 4/2011 | |
| WO | WO/2012/161872 | | 11/2012 | |
| WO | WO 2012161872 A1 * | | 11/2012 | ............ B01J 8/0492 |

OTHER PUBLICATIONS

Gunawan et al. ("Upgrading of bio-oil into advanced biofuels and chemicals. Part I. Transformation of GC-detectable light species during the hydrotreatment of bio-oil using Pd/C catalyst", Fuel, vol. 111 (2013), p. 709-717).*

PCT/US2015/042477—International Search Report and Written Opinion—dated Sep. 22, 2015.

* cited by examiner

Primary Examiner — Brian A McCaig
Assistant Examiner — Jason Y Chong
(74) Attorney, Agent, or Firm — Dunlap Codding, P.C.

(57) ABSTRACT

A process and system for hydroprocessing biopyrolysis oils is provided and includes the rejuvenation of an at least partially flow constricted biopyrolysis oil hydroprocessing reactor(s) by flushing with a flushing agent at reduced temperatures.

25 Claims, 3 Drawing Sheets

REJUVENATION OF BIOPYROLYSIS OIL
HYDROPROCESSING REACTORS

BACKGROUND

1. Field of the Invention

The presently disclosed and/or claimed inventive process(es), procedure(s), method(s), product(s), result(s), and/or concept(s) (collectively hereinafter referred to as the "presently disclosed and/or claimed inventive concept(s)") relates generally to processes and systems for hydroprocessing biopyrolysis oils. More specifically, the presently disclosed and/or claimed inventive concept(s) relates to the rejuvenation of an at least partially flow constricted biopyrolysis oil hydroprocessing reactor(s).

2. Description of the Related Art

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis (with and without a catalyst), liquefaction, and enzymatic conversion. The product produced from the fast pyrolysis of biomass is a liquid product commonly referred to as "biopyrolysis oil". Biopyrolysis oil may be processed into transportation fuels, hydrocarbon chemicals, and/or specialty chemicals.

Biopyrolysis oils are generally less stable than petroleum derived hydrocarbons. This instability is associated with bimolecular reactions of oxygen-containing compounds, such as condensation and/or polymerization reactions. At the typical elevated reactor temperatures of biopyrolysis oil hydroprocessing reactors (such as 300-800° F.), these instability reactions become more pronounced resulting in heavier compounds which create deposits in the biopyrolysis oil hydroprocessing reactors. In order to minimize such fouling in commercial operations, biopyrolysis oil hydroprocessing reactor temperatures are kept as low as possible while still sufficiently high to provide effective hydrodeoxygenation. However, even with such temperature control, there is still significant fouling requiring frequent and costly unit shutdowns for deposit removal, hydroprocessing catalyst regeneration, and/or hydroprocessing catalyst replacement. Accordingly, there remains a need for an improved and efficient process for rejuvenating an at least partially flow constricted biopyrolysis oil hydroprocessing reactor.

SUMMARY OF THE INVENTION

In accordance with one embodiment, the presently disclosed and/or claimed inventive concept(s) is directed to a process comprising the steps of:
(a) providing an at least partially flow constricted biopyrolysis oil hydroprocessing reactor comprising a hydroprocessing catalyst and flow constricting deposits; and
(b) flushing the at least partially flow constricted biopyrolysis oil hydroprocessing reactor with a flushing agent resulting in a rejuvenated biopyrolysis oil hydroprocessing reactor comprising less flow constricting deposits as compared to the at least partially flow constricted biopyrolysis oil hydroprocessing reactor.

In accordance with another embodiment, the presently disclosed and/or claimed inventive concept(s) is directed to a process comprising the steps of:
(a) providing a biopyrolysis oil hydroprocessing reactor comprising a hydroprocessing catalyst;
(b) charging hydrogen and a biopyrolysis oil feedstream comprising a biopyrolysis oil to the biopyrolysis oil hydroprocessing reactor, operated at a weighted average bed temperature from about 300° F. to about 800° F., for at least partial hydroprocessing of the biopyrolysis oil feedstream in the presence of the hydroprocessing catalyst, producing a hydroprocessed product stream, until the differential pressure of the biopyrolysis oil hydroprocessing reactor exceeds about 50 psig as a result of the formation of flow constricting deposits within the biopyrolysis oil hydroprocessing reactor, thereby resulting in an at least partially flow constricted biopyrolysis oil hydroprocessing reactor;
(c) reducing the weighted average bed temperature of the at least partially flow constricted biopyrolysis oil hydroprocessing reactor to less than about 200° F.;
(d) flushing the at least partially flow constricted biopyrolysis oil hydroprocessing reactor with a flushing agent resulting in a rejuvenated biopyrolysis oil hydroprocessing reactor comprising less flow constricting deposits as compared to the at least partially flow constricted biopyrolysis oil hydroprocessing reactor; and
(e) operating the rejuvenated biopyrolysis oil hydroprocessing reactor at a weighted average bed temperature in the range of from about 300° F. to about 800° F. to continue producing the hydroprocessed product stream.

DETAILED DESCRIPTION

Figure 1:
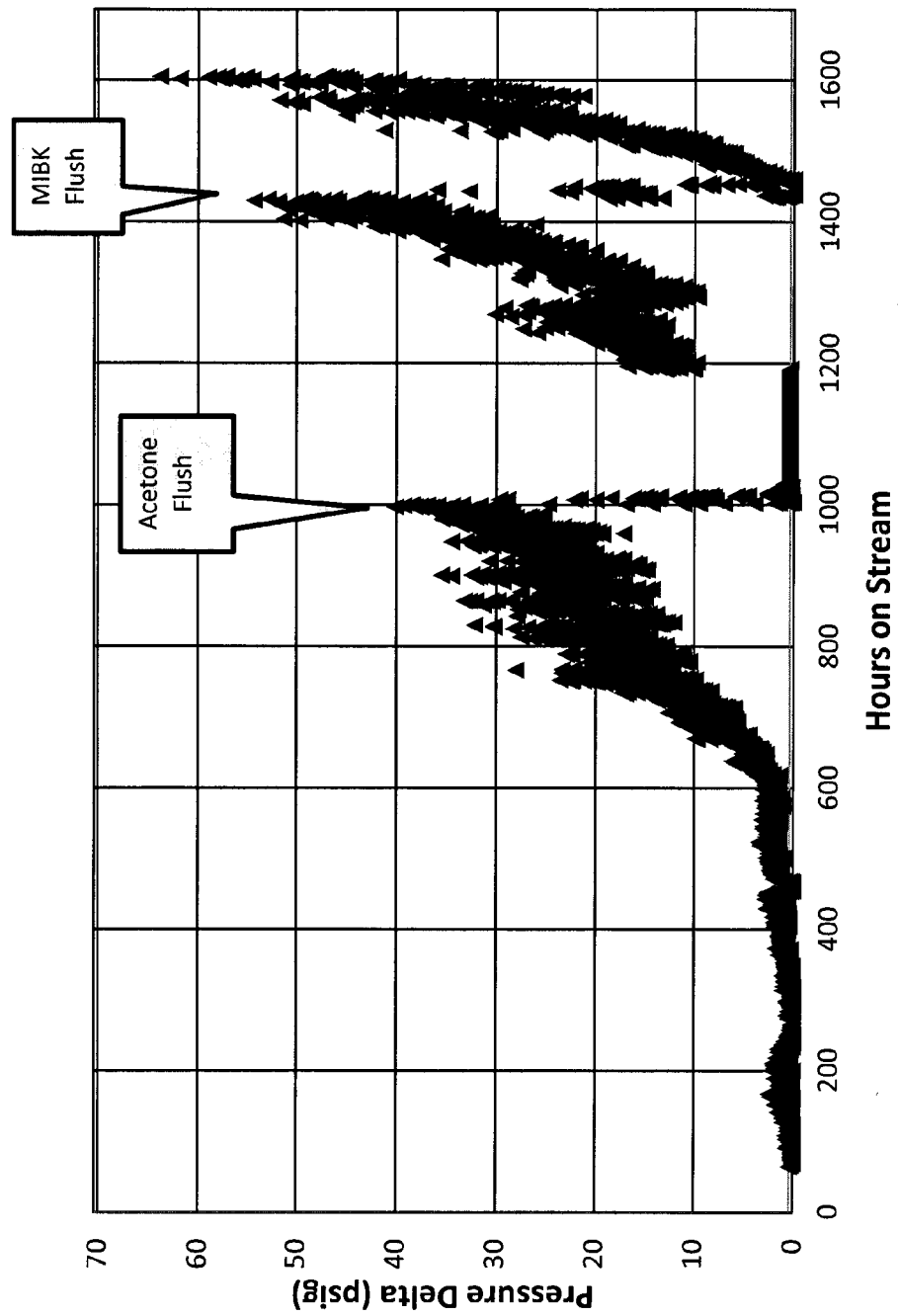
FIG. 1 is a plot of Pressure Differential vs. hours on stream for a two-reactor hydrotreating system.

Biopyrolysis oil can be prepared from the fast pyrolysis of biomass, with or without the presence of a catalyst. The biomass can be in the form of solid particles, and can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

The biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst prior to conversion of the biomass by fast pyrolysis in a biomass conversion reactor. Alternatively, the catalyst may be introduced directly into the biomass conversion reactor for contact with the biomass. The biomass conversion reactor can be, for example, a fluidized bed reactor, a cyclone reactor, an ablative reactor, or a riser reactor. The catalyst may be fresh and/or regenerated catalyst. The catalyst can, for example, comprise a solid acid, such as a zeolite. Examples of suitable zeolites include ZSM-5, mordenite, beta, ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material.

More specifically, fast pyrolysis may include thermal and/or catalytic cracking. As used herein, "pyrolysis" refers to the thermal or thermochemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, non-condensable gases recycled from the biomass conversion process, and/or any combination thereof. Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

The conversion effluent exiting the biomass conversion reactor generally comprises gas, vapors, and solids. As used herein, the vapors produced during the conversion reaction may interchangeably be referred to as the biopyrolysis oil, which is the common name for the vapors when condensed into their liquid state. Such biopyrolysis oil can have an oxygen content that is less than 15, 12, 10, or 8 percent by weight of the biopyrolysis oil. The oxygen content can also be greater than about 0.5, 1, 3, or 5 percent by weight of the biopyrolysis oil.

The biopyrolysis oil can then be recovered from the biomass conversion reactor. A biopyrolysis oil feedstream comprising all or a portion of the biopyrolysis oil can be charged, along with hydrogen, to a biopyrolysis oil hydroprocessing reactor comprising a hydroprocessing catalyst, operated at a weighted average bed temperature from about 250° F. to about 800° F. or from about 300° F. to about 720° F., for upgrading by at least partial hydroprocessing of the biopyrolysis oil feedstream in the presence of the hydroprocessing catalyst, producing a hydroprocessed product stream.

In accordance with an embodiment, the charging of the biopyrolysis oil feedstream to the biopyrolysis oil hydroprocessing reactor results in the formation of flow constricting deposits resulting in an at least partially flow constricted biopyrolysis oil hydroprocessing reactor comprising the hydroprocessing catalyst and the flow constricting deposits.

The at least partially flow constricted biopyrolysis oil hydroprocessing reactor can then be flushed with a flushing agent resulting in a rejuvenated biopyrolysis oil hydroprocessing reactor comprising less flow constricting deposits as compared to the at least partially flow constricted biopyrolysis oil hydroprocessing reactor. The rejuvenated biopyrolysis oil hydroprocessing reactor can contain at least 20 wt % less flow constricting deposits than the at least partially flow constricted biopyrolysis oil hydroprocessing reactor.

The pressure drop of a biopyrolysis oil feedstream passed through the rejuvenated biopyrolysis oil hydroprocessing reactor is lower than the pressure drop of a biopyrolysis oil feedstream passed through the at least partially flow constricted biopyrolysis oil hydroprocessing reactor operated at identical conditions as that of the rejuvenated biopyrolysis oil hydroprocessing reactor.

In accordance with an embodiment, the biopyrolysis oil feedstream is charged to the biopyrolysis oil hydroprocessing reactor until the differential pressure of the biopyrolysis oil hydroprocessing reactor exceeds about 50 psig or about 75 psig or about 100 psig as a result of the formation of the flow constricting deposits within the biopyrolysis oil hydroprocessing reactor, thereby resulting in the at least partially flow constricted biopyrolysis oil hydroprocessing reactor. At such point, the weighted average bed temperature of the at least partially flow constricted biopyrolysis oil hydroprocessing reactor can be reduced to less than about 200° F. or less than about 150° F. or less than about 100° F. The at least partially flow constricted biopyrolysis oil hydroprocessing reactor can then be flushed with a flushing agent resulting in the rejuvenated biopyrolysis oil hydroprocessing reactor comprising less flow constricting deposits as compared to the at least partially flow constricted biopyrolysis oil hydroprocessing reactor, as described above. Following such flushing, the rejuvenated biopyrolysis oil hydroprocessing reactor can be operated at a weighted average bed temperature in the range of from about 250° F. to about 800° F. or from about 300° F. to about 720° F., to continue producing the hydroprocessed product stream. The biopyrolysis oil hydroprocessing reactor and the rejuvenated biopyrolysis oil hydroprocessing reactor are each operated at an outlet pressure in the range of from about 900 psig to about 2200 psig, or from about 1500 psig to about 2000 psig, or from about 1600 psig to about 1900 psig. The flushing agent can comprise the biopyrolysis oil feedstream.

Optionally, the flow of the biopyrolysis oil feedstream to the at least partially flow constricted biopyrolysis oil hydroprocessing reactor can also be reduced or stopped prior to or during the flushing step; and the charging of the biopyrolysis oil feedstream to the rejuvenated biopyrolysis oil hydroprocessing reactor following the flushing step can be resumed.

Further, the differential pressure of each of (i) the biopyrolysis oil hydroprocessing reactor and (ii) the rejuvenated biopyroloysis oil hydroprocessing reactor are lower than the differential pressure of the at least partially flow constricted biopyrolysis oil hydroprocessing reactor.

The at least partially flow constricted biopyrolysis oil hydroprocessing reactor can have an elevated pressure drop in the range of from about 15 psig to about 100 psig, or from about 15 psig to about 75 psig, or from about 15 psig to about 50 psig, and the rejuvenated biopyrolysis oil hydroprocessing reactor has a lower pressure drop in the range of from about 2 psig to about 15 psig, or from about 5 psig to about 10 psig.

The flow constricting deposits can comprise a component selected from the group consisting of: high boiling components of a biopyroloysis oil feedstream, high boiling components of a partially reacted product of the biopyrolysis oil feedstream, char, catalyst fines, and combinations thereof. The high boiling components can include heavy oxygenated hydrocarbons and/or tar. Such heavy oxygenated hydrocarbons can have an atomic mass of greater than about 600 amu and a boiling point greater than about 1000° F.

The flushing agent can be selected from the group consisting of hydrogen gas, a polar solvent, a biopyrolysis oil, and combinations thereof. The flushing step described above can be performed at a temperature less than about 200° F., or less than about 150° F., or less than about 100° F.

The polar solvent can be a polar aprotic solvent or a polar protic solvent. The polar aprotic solvent can be selected from the group consisting of methyl isobutylketone, dimethyl sulfoxide, sulfolane, tetrahydrofuran, ethyl acetate, acetone, and combinations thereof. The polar protic solvent can be selected from the group consisting of formic acid, an alcohol, acetic acid, phenol, and combinations thereof. Such alcohol can be selected from the group consisting of methanol, isopropanol, butanol, 2-ethylhexanol, ethanol, and combinations thereof. When the flushing agent comprises phenol, it further comprises an aromatic hydrocarbon.

The at least partially flow constricted biopyrolysis oil hydroprocessing reactor can be a fixed bed tubular reactor, and the hydroprocessing catalyst can be in the form of pellets and can comprise metals on a refractory oxide. The metals can be selected from the group consisting of nickel, molybdenum, cobalt, ruthenium, and combinations thereof, and the refractory oxide can be selected from the group consisting of alumina, carbon, zirconium oxide, and combinations thereof.

At least a portion of the flow constricting deposits can be in the form of plugs. When the flow constricting deposits comprise plugs, the flushing step described above can break up at least a portion of the plugs.

EXAMPLES

Example 1

A biopyrolysis oil was produced from the conversion of southern yellow pine wood particles by pyrolysis in the presence of a catalyst in a riser reactor operated at a reactor outlet temperature of about 650° C. The resulting biopyrolysis oil had an oxygen content of less than 25 weight percent. The biopyrolysis oil was charged to a hydroprocessing reactor system including two reactors, along with hydrogen. The feed was first charged to Reactor 1 and the effluent from Reactor 1 was then charged to Reactor 2 to produce a hydroprocessed product. Reactor 1 was loaded with 450 cc of a 5 mm commercial Ni/Mo hydrotreating catalyst (2.5 mm quadralobe extrudates). Reactor 2 was loaded with 450 cc of a 2.5 mm commercial Ni/Mo hydrotreating catalyst.

The operating conditions during the run are listed below:
  weighted average bed temperatures "WABT" Reactor 1=657° F.
  weighted average bed temperatures "WABT" Reactor 2=702° F.
  biopyrolysis oil feed rate: 135 cc per hour
  hydrogen feed rate: 26 standard cubic feet per hour
  Inlet pressure: as required to achieve an 1800 psig inlet pressure into reactor 2.

Figure 2:
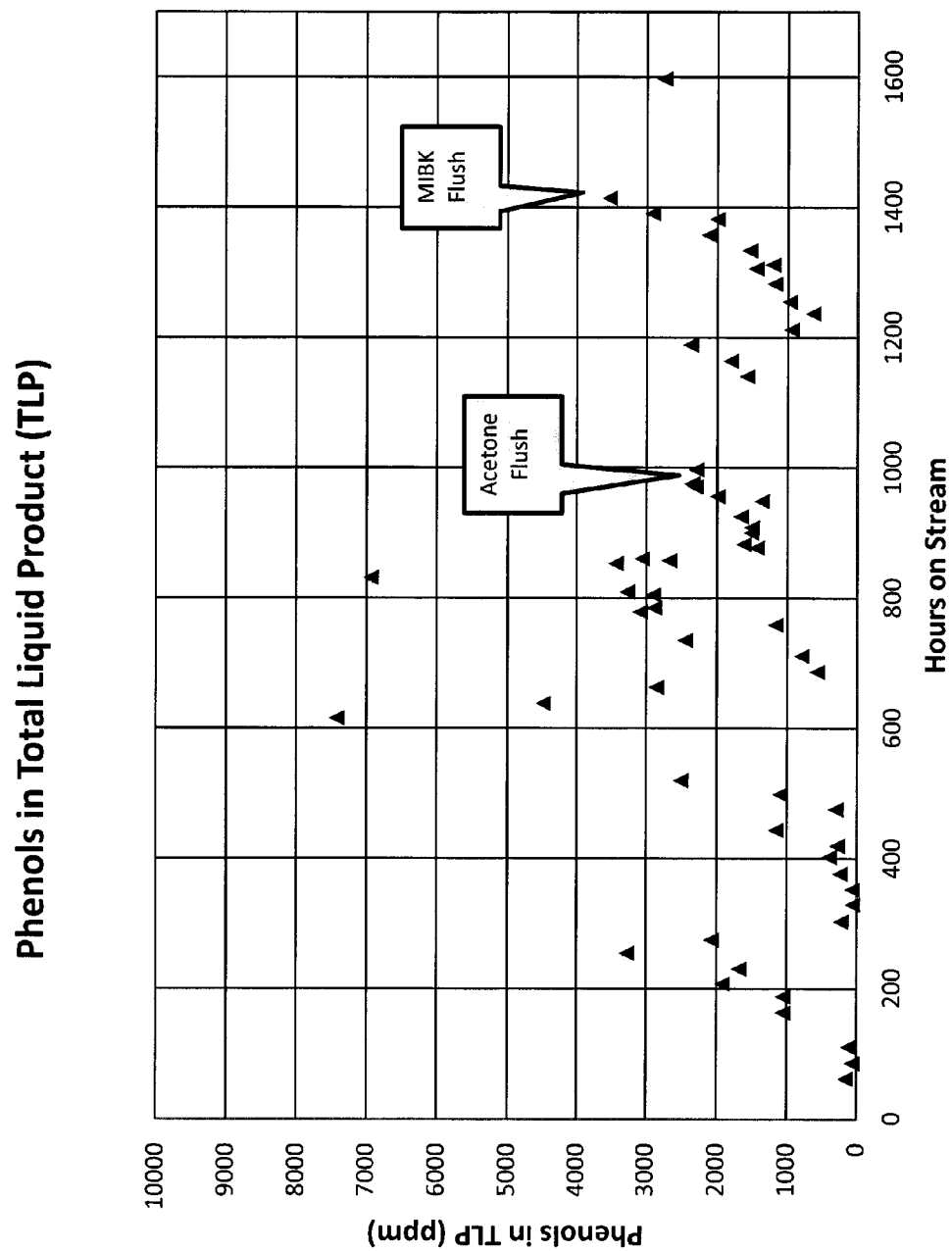
FIG. 2 is a plot of Phenols vs. hours on stream for a two-reactor hydrotreating system.
Figure 3:
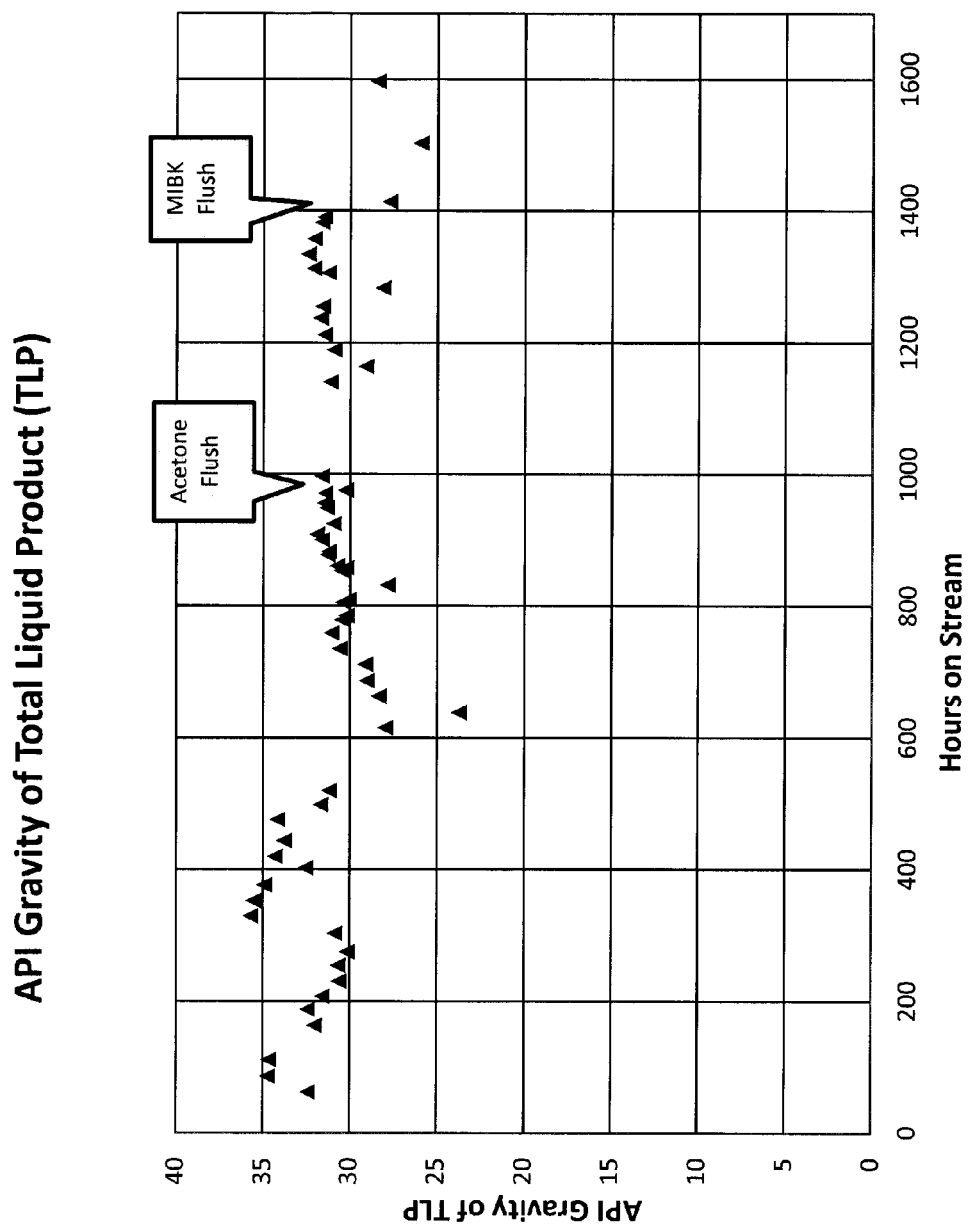
FIG. 3 is a plot of API gravity vs. hours on stream for a two-reactor hydrotreating system.

A plot of the difference between the Rx 1 inlet pressure and the Rx 2 outlet pressure ("Pressure Differential") is show in FIG. 1. The Pressure Differential was measured at less than 2 psig at the start of the run. The Pressure Differential remained low for the first 600 hours on stream and then began to rise until it exceeded 39 psig at about 1000 hours on stream. At this time, the liquid and gas feed to the reactor was stopped. The reactors were allowed to cool to less than 100° F., and a flow of acetone was started through the reactors at 270 cc/hr at 200-500 psig for 12 hours. The reactor was then restarted and brought back to the start of run conditions. The Pressure Differential in the reactors was then measured to be less than 3 psig. No automated data was logged for the next 190 hours because of a problem with the computer logging software. However, the data collection restarted at 1191 hours on stream. At that time the Pressure Differential was measured at less than 17 psig. The run continued until 1429 hours on stream, and during this period the Pressure Differential increased to 54 psig. At this time the feed was stopped, the reactor was allowed to cool to less than 150° F., and a flow of methyl isobutyl ketone (MIBK) was started through the reactors at 270 cc/hr at 200-500 psig for 12 hours. The feed was reintroduced to the reactor and the Pressure Differential again decreased to less than 2 psig just after feed reintroduction. The pressure differential continued to increase over the next 150 hours until it reached 63.5 psig at which point the experiment was terminated. The data in FIG. 1 demonstrate that the flushes (acetone and MIBK) were effective in returning the reactor system to a low Pressure Differential, enabling a longer run life without the need for catalyst regeneration. The activity of the catalyst for feed deoxygenation (as demonstrated through the level of phenols in the product shown in FIG. 2) and the API gravity increase of the product over the feed, as shown in FIG. 3, were similar before and after the flushing indicating that the activity of the catalyst was not affected by the flushing procedure. The product streams were analyzed for phenols using UOP analytical method No. UOP262-99 Phenols and Thiophenols in Petroleum Products by Spectrophotometry.

Example 2

A biopyrolysis oil was produced from the conversion of southern yellow pine wood particles by pyrolysis in the presence of a catalyst in a riser reactor operated at a reactor outlet temperature of about 650° C. The resulting biopyrolysis oil had an oxygen content of less than 25 weight percent and an API gravity of about −2. The biopyrolysis oil was charged to a hydroprocessing reactor system including two reactors, along with hydrogen. The feed was first charged to Reactor 1 and the effluent from Reactor 1 was then charged to Reactor 2 to produce a hydroprocessed product. Reactor 1 was loaded with 150 cc of a commercial 5 mm active ring catalyst on the top and 300 cc of a commercial Ni/Mo hydrotreating catalyst (2.5 mm extrudates) on the bottom. Reactor 2 was loaded with 50 cc of 5 mm active ring catalyst on the top and 400 cc of a commercial Ni/Mo hydrotreating catalyst (2.5 mm extrudates) on the bottom. The active ring catalyst served as a bed grading material while the commercial Ni/Mo hydrotreating catalyst served as an active catalyst. Larger size (1/10") active catalysts were selected to prevent reactor plugging, and therefore extending reactor cycle length. The total catalyst loading was 900 cc, including active rings. Table 1 below shows the process conditions (outlet pressures, weighted average bed temperatures "WABT", biopyrolysis oil feed rate, and hydrogen feed rate) along with the API gravities and specific gravities for the resulting product measured at various times on stream. At about 158 hours on stream, the differential pressure between the inlet pressure for Reactor 1 and the outlet pressure for Reactor 2 rose to around 30 to 50 psig, necessitating the "flush" of the hydroprocessing reactor system wherein the biopyrolysis oil feed rate was steadily reduced and the WABT's for Reactors 1 and 2 were lowered during the hydrogen flush. Following the flush, the differential pressure for the hydroprocessing reactor system was significantly reduced. The flow of hydrogen was maintained throughout most of the flush period, which lasted until hour 169, at which point the biopyrolysis oil feed rate and WABT's for Reactors 1 and 2 were ramped up to around the pre-flush levels.

TABLE 1

| Hours on Stream | Rx 2, Outlet Pressure (psig) | WABT of Rx 1 | WABT of Rx 2 | Biopyrolysis oil Feed Rate (g/h) | $H_2$ Flow Rate (SCF/h) | Product API Gravity | Product Specific Gravity |
|---|---|---|---|---|---|---|---|
| 148 | 1490.2 | 558.0 | 664.6 | 345.8 | 18.9 | * | * |
| 149 | 1490.5 | 557.3 | 666.8 | 346 | 19.0 | 18.63 | 0.9425 |
| 150 | 1494.0 | 558.7 | 668.6 | 345.3 | 18.8 | * | * |
| 151 | 1504.4 | 559.3 | 669.4 | 347.0 | 18.8 | * | * |
| 152 | 1482.2 | 558.7 | 668.6 | 350.1 | 18.8 | * | * |
| 153 | 1495.4 | 558.0 | 669.2 | 342.7 | 18.9 | * | * |
| 154 | 1499.9 | 558.3 | 674.6 | 350.1 | 18.8 | * | * |
| 155 | 1499.4 | 558.3 | 675.8 | 350.1 | 18.8 | * | * |
| 156 | 1486.2 | 562.0 | 667.8 | 350.1 | 18.9 | * | * |
| 157 | 1491.8 | 533.0 | 641.4 | 348.2 | 18.9 | 19.39 | 0.938 |
| 158 | 1500.8 | 508.0 | 613.8 | 345.4 | 18.8 | * | * |
| 159 | 1499.4 | 491.3 | 586.6 | 348.4 | 18.8 | * | * |
| 160 | 1498.6 | 484.3 | 563.0 | 339.9 | 18.8 | * | * |
| 161 | 1489.3 | 481.7 | 544.4 | 321.0 | 18.9 | * | * |
| 162 | 1504.1 | 479.7 | 528.2 | 252.5 | 18.8 | * | * |
| 163 | 1500.4 | 477.7 | 519.6 | 195.9 | 18.8 | * | * |
| 164 | 1465.3 | 475.0 | 499.8 | 59.3 | 9.4 | * | * |
| 165 | 1363.7 | 471.7 | 480.2 | 1.0 | 0 | * | * |
| 166 | 1172.1 | 467.3 | 472.6 | 1.2 | 12.4 | * | * |
| 167 | 1533.1 | 467.3 | 472.4 | 0.3 | 24.4 | * | * |
| 168 | 1500.3 | 483.7 | 480.4 | 278.2 | 18.9 | * | * |
| 169 | 1485.4 | 528.0 | 512.0 | 278.2 | 18.8 | * | * |
| 170 | 1494.4 | 573.7 | 545.4 | 373.9 | 18.9 | * | * |
| 171 | 1502.2 | 586.3 | 566.0 | 354.8 | 18.9 | * | * |
| 172 | 1504.7 | 575.0 | 597.4 | 347.9 | 18.9 | * | * |
| 173 | 1503.6 | 563.7 | 643.0 | 371.8 | 18.8 | 20.0 | 0.934 |
| 174 | 1504.4 | 555.0 | 673.4 | 370.1 | 18.8 | * | * |
| 175 | 1503.3 | 554.3 | 666.8 | 338.2 | 18.9 | * | * |
| 176 | 1501.8 | 565.3 | 663.8 | 338.2 | 18.9 | * | * |
| 177 | 1501.2 | 561.3 | 662.2 | 342.0 | 18.9 | 20.59 | 0.9304 |

*—Not measured

As can be seen from the data, the API gravities at hour 173 and hour 177 (post-flush) were 20.0 and 20.59, respectively, which are slightly higher (improved) over the API gravity at hour 157 (pre-flush) of 19.39. Also, the specific gravities at hour 173 and hour 177 (post-flush) were 0.934 and 0.9304, respectively, which are slightly lower (improved) over the specific gravity at hour 157 (pre-flush) of 0.938. This data shows an improvement in product quality resulting from the flush.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

It is the inventors' intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A process, comprising:
   (a) providing a biopyrolysis oil hydroprocessing reactor comprising a hydroprocessing catalyst wherein the reactor is at least partially constricted with flow constricting deposits, wherein the reactor has an operational weighted average bed temperature from about 250° F. to about 800° F.;
   (b) reducing the operational weighted average bed temperature of the reactor to less than about 200° F.; and
   (c) flushing the reactor, at the reduced operational weighted average bed temperature, with a flushing agent thereby resulting in a rejuvenated reactor comprising less flow constricting deposits as compared to the at least partially constricted reactor, wherein the catalyst is not removed from the reactor prior to step (c).

2. The process of claim 1 wherein the at least partially constricted reactor has an elevated pressure drop of a biopyrolysis oil feedstream pass through the reactor in a range of from about 15 psig to about 100 psig, and the rejuvenated reactor has a lower pressure drop of the biopyrolysis oil feedstream pass through the reactor in a range of from about 5 psig to about 15 psig.

3. The process of claim 1 wherein the flow constricting deposits comprise a component selected from the group consisting of: high boiling components of a biopyroloysis oil feedstream, high boiling components of a partially reacted product of the biopyrolysis oil feedstream, char, catalyst fines, and combinations thereof.

4. The process of claim 1 wherein the flushing agent is selected from the group consisting of hydrogen gas, a polar solvent, a biopyrolysis oil, and combinations thereof.

5. The process of claim 4 wherein the flushing agent comprises the polar solvent.

6. The process of claim 5 wherein the polar solvent is a polar aprotic solvent selected from the group consisting of methyl isobutylketone, dimethyl sulfoxide, sulfolane, tetrahydrofuran, ethyl acetate, acetone, and combinations thereof.

7. The process of claim 5 wherein the polar solvent is a polar protic solvent selected from the group consisting of formic acid, an alcohol, acetic acid, phenol, and combinations thereof.

8. The process of claim 4 wherein the flushing agent comprises the hydrogen gas.

9. The process of claim 4 wherein the flushing agent comprises the biopyrolysis oil.

10. The process of claim 1 wherein the at least partially constricted reactor is a fixed bed tubular reactor, and wherein the hydroprocessing catalyst is in a form of pellets and comprises metals on a refractory oxide.

11. The process of claim 1 wherein at least a portion of the flow constricting deposits are in a form of plugs, and wherein the flushing of step (b) breaks up at least a portion of the plugs.

12. The process of claim 1 wherein a pressure drop of a biopyrolysis oil feedstream passed through the rejuvenated reactor is lower than a pressure drop of a biopyrolysis oil feedstream passed through the at least partially constricted reactor operated at identical conditions as that of the rejuvenated reactor.

13. A process, comprising:
(a) providing a reactor comprising a hydroprocessing catalyst, wherein the reactor has an operational differential pressure of greater than about 50 psig as a result of flow constricting deposits formed within the reactor during the hydroprocessing of a biopyrolysis oil at a weighted average bed temperature from about 300° F. to about 800° F.;
(b) reducing the weighted average bed temperature of the reactor to about 200° F. or less;
(c) flushing the reactor, at the reduced weighted averaged bed temperature, with a flushing agent thereby resulting in a rejuvenated reactor comprising less flow constricting deposits as compared to the reactor of step (a), wherein the catalyst is not removed from the reactor prior to step (c); and
(d) operating the rejuvenated reactor at a weighted average bed temperature in the range of from about 300° F. to about 800° F. to produce a hydroprocessed product stream from a biopyrolysis oil feedstream.

14. The process of claim 13 wherein the reactor of step (a) and the rejuvenated reactor of step (d) are each operated at an outlet pressure in a range of from about 900 psig to about 2200 psig.

15. The process of claim 13 wherein the flushing agent is selected from the group consisting of hydrogen gas, a polar solvent, a biopyrolysis oil, and combinations thereof.

16. The process of claim 15 wherein the flushing agent comprises the biopyrolysis oil.

17. The process of claim 15 wherein step (b) further comprises reducing or stopping the flow of the biopyrolysis oil feedstream to the at least partially constricted reactor; and wherein step (d) further comprises resuming the charging of the biopyrolysis oil feedstream to the rejuvenated reactor.

18. The process of claim 17 wherein the flushing agent comprises the polar solvent.

19. The process of claim 18 wherein the polar solvent is a polar aprotic solvent selected from the group consisting of methyl isobutylketone, dimethyl sulfoxide, sulfolane, tetrahydrofuran, ethyl acetate, acetone, and combinations thereof.

20. The process of claim 18 wherein the polar solvent is a polar protic solvent selected from the group consisting of formic acid, an alcohol, acetic acid, phenol, and combinations thereof.

21. The process of claim 17 wherein the flushing agent comprises the hydrogen gas.

22. The process of claim 13 wherein the reactor is a fixed bed tubular reactor, and wherein the hydroprocessing catalyst is in a form of pellets and comprises metals on a refractory oxide.

23. The process of claim 13 wherein the flow constricting deposits comprise a component selected from the group consisting of: high boiling components of a biopyroloysis oil feedstream, high boiling components of a partially reacted product of the biopyrolysis oil feedstream, char, catalyst fines, and combinations thereof.

24. The process of claim 13 wherein at least a portion of the flow constricting deposits are in the form of plugs, and wherein the flushing of step (d) breaks up at least a portion of the plugs.

25. The process of claim 13 wherein the differential pressure of each of (i) the reactor of step (a) and (ii) the rejuvenated reactor of step (d) are lower than the differential pressure of the at least partially constricted reactor following step (b).

* * * * *